United States Patent [19]

Hiller et al.

[11] 3,956,903

[45] May 18, 1976

[54] SYSTEM FOR RECOVERING AND CONDENSING VAPORS

[75] Inventors: Trueman W. Hiller; Klaus D. Jarr, both of Bettendorf, Iowa

[73] Assignee: Weil-McLain Co., Inc., Dallas, Tex.

[22] Filed: Apr. 25, 1975

[21] Appl. No.: 571,510

[52] U.S. Cl. .................................... 62/54; 55/88; 55/89; 220/85 VR
[51] Int. Cl.² ........................................ F17C 7/02
[58] Field of Search............ 55/88, 89; 220/85 VR, 220/85 VS; 62/5, 54; 165/110, 111

[56] References Cited
UNITED STATES PATENTS

| | | | |
|---|---|---|---|
| 2,004,074 | 6/1935 | Kiley | 220/85 VR |
| 2,059,942 | 11/1936 | Gibson | 55/88 X |
| 3,654,768 | 4/1972 | Inglis et al. | 62/5 |
| 3,791,422 | 2/1974 | Johnson et al. | 62/54 X |

*Primary Examiner*—William O'Dea
*Assistant Examiner*—Ronald C. Capossela
*Attorney, Agent, or Firm*—Lane, Aitken, Dunner & Ziems

[57] ABSTRACT

A system for recovering and condensing vapors from a liquid process or storage tank in which a shell is connected to the tank for receiving the vapors from the tank, and a vortex tube is adapted to supply a stream of cold air into said shell. The cold air is passed in a heat exchange relation to the vapors in said shell to condense the vapors, and the condensed vapors are passed back to the tank.

21 Claims, 2 Drawing Figures

SYSTEM FOR RECOVERING AND CONDENSING VAPORS

BACKGROUND OF THE INVENTION

This invention relates to a vapor recovery and condensing system and, more particularly, to such a system in which vapors are recovered from a liquid process or storage tank, condensed, and passed back to the tank.

With the increased emphasis on preventing pollution of the atmosphere, recent attention has been directed to minimizing the introduction of vapors into the atmosphere from permanent type underground storage tanks, solvent cleaning processes, or the like. Taking gasoline as an example, underground storage tanks are provided at service stations which are periodically filled by transport trucks which, in turn, receive the gasoline from regionally located bulk storage tanks. Gasoline vapors accumulate in the upper portions of the tanks at the service stations and the bulk storage tanks as a result of natural vaporization of the gasoline in the tanks. Also, additional air and vapors may be drawn into the storage tanks at some service stations from the vehicle tanks by virtue of use of vapor recovery equipment, or the like.

As a result of this accumulation of air and vapors, vent pipes or the like, are presently provided on each of the storage tanks for venting the vapors to atmosphere.

Previously it has been proposed to condense the vapors from the tanks and venting only the remaining air to atmosphere using refrigeration or carbon absorption systems, or the like, which are very complex and costly.

SUMMARY OF THE INVENTION

It is therefore an object of the present invention to provide a system for recovering and condensing vapors from a liquid process or storage tank.

It is a further object of the present invention to provide a system of the above type in which the vapors are captured, condensed, and passed back to the tank.

It is a further object of the present invention to provide a system of the above type which is relatively simple to operate and relatively low in cost.

Toward the fulfillment of these and other objects, the system of the present invention comprises a shell, means connecting a liquid process or storage tank to the shell for permitting the vapors in the tank to pass into the shell, a vortex tube connected to a source of compressed air and adapted to convert the air into a stream of cold air, means for passing the cold air in a heat exchange relation to the vapors in the shell to condense the vapors, and means for passing the condensed vapors back to the tank.

DESCRIPTION OF THE PREFERRED EMBODIMENTS

Figure 1:
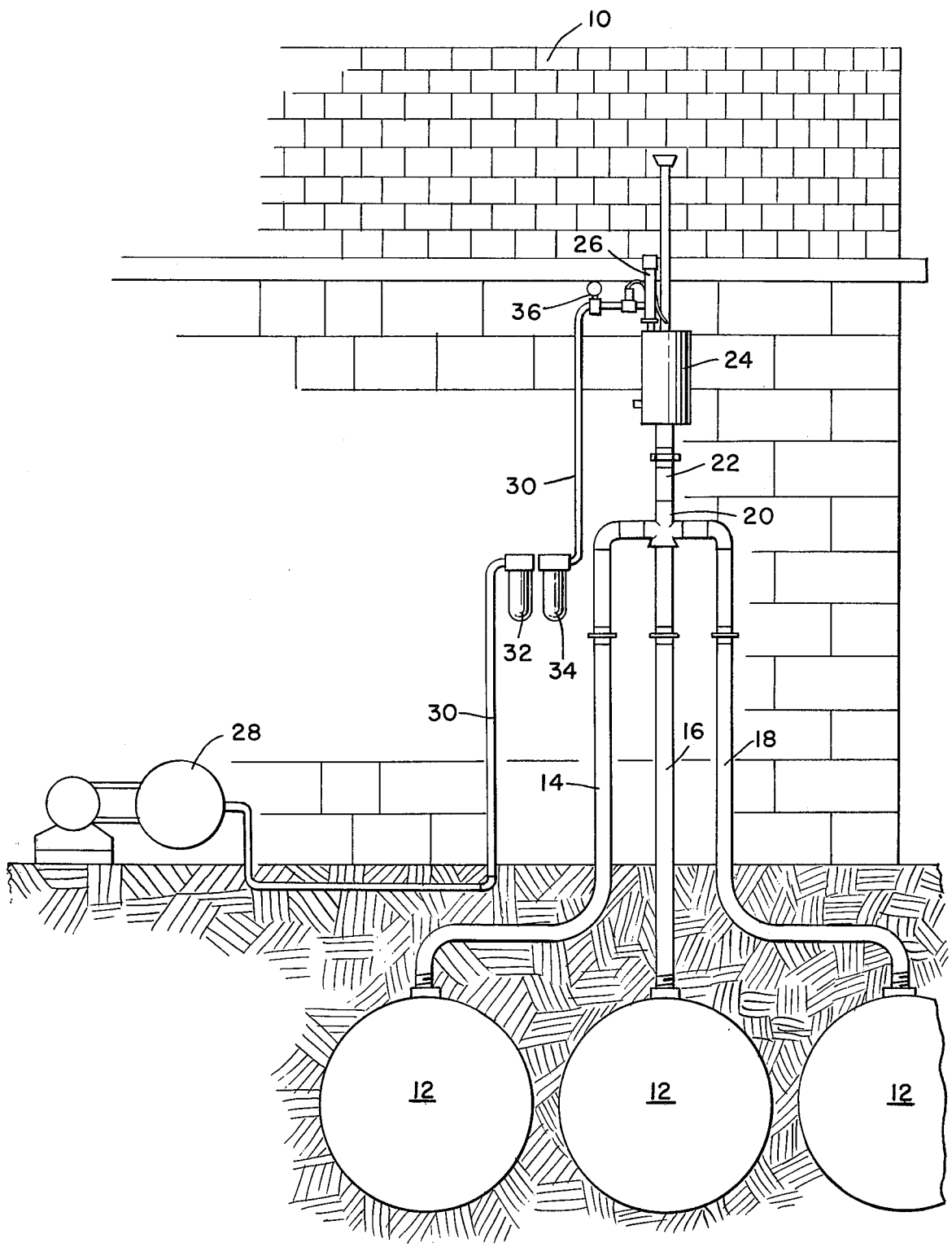
FIG. 1 is a partial schematic, partial elevational view of the system of the present invention.

Referring specifically to FIG. 1 of the drawings, the system of the present invention will be described in connection with the recovery of vapors from a gasoline dispensing installation, or service station, including a building shown in general by the reference numeral 10 and a plurality of underground storage tanks 12 for containing gasoline of various grades for dispensing to the vehicles serviced by the station.

The system of the present invention is located adjacent the building 10 and includes a plurality of pipes 14, 16, and 18 connecting the upper portion of each tank with a common junction 20 which, in turn, is connected to a pipe 22 extending to a condensing unit 24 which will be described in detail later. A vortex tube 26, also to be described in detail later, is supported on the condensing unit 24 and receives compressed air from an air compressor 28 via a line 30 in which is connected an air filter 32, an oil trap 34, and an air regulator 36. The compressor 28 may be a standard type normally associated with a service station for actuating hydraulic lifts and the like, and the air filter 32, the oil trap 34, and the air regulator 36 are also conventional items and therefore will not be described in any further detail.

Figure 2:
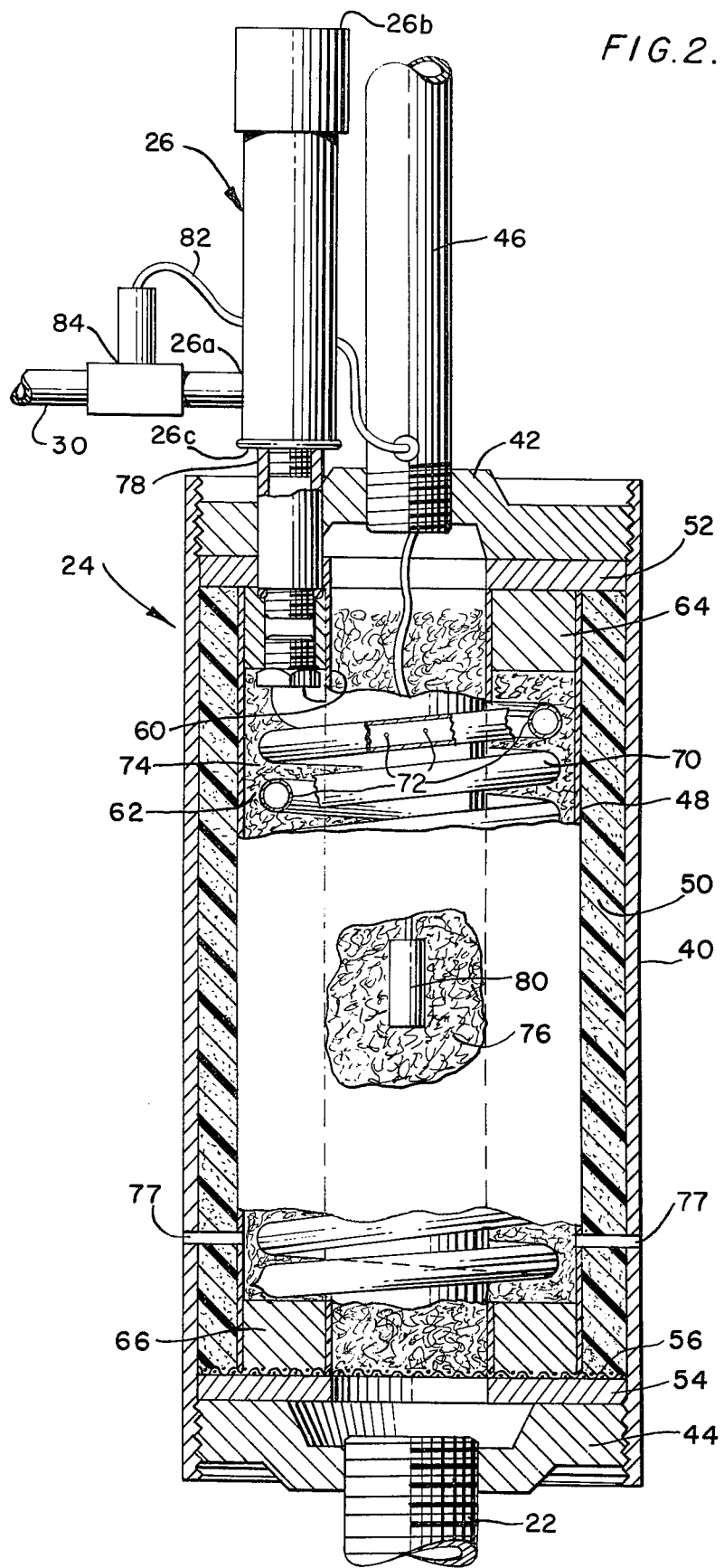
FIG. 2 is a cross-sectional view of the condensing unit utilized in the system of the present invention.

The vapors which accumulate in the tanks in the manner discussed above pass upwardly through the pipes 14, 16, and 18 by virtue of increased pressure, where they accumulate in the line 22 for passage to the condensing unit 24, which is shown in detail in FIG. 2.

The condensing unit 24 includes an outer cylindrical shell 40 open at both ends and having plug members 42 and 44 threadedly engaging in corresponding internally threaded portions in the respective end portions of the shell. The plug member 42 has a central opening for receiving a vent pipe 46, and the plug member 44 has a central opening for receiving the pipe 22 and thus introducing the vapors from the tanks 12 into the shell 40.

An inner shell 48 extends within the shell 40 in a spaced relationship thereto and a urethane foam insulation, shown in general by the reference numeral 50, extends in the annular space between the two shells. A pair of gaskets 52 and 54 extend within the shell 40 and abut against the inner faces of the plug members 42 and 44, respectively, and a soldered fitting screen 56 abuts the inner face of the gasket 54. The upper ends of the inner shell 48 and the insulation 50 abut the inner face of the gasket 52 and their lower ends abut the screen 56. A liner 60 extends within the inner shell 48 and extends for the complete length of the latter shell, with the ends of the liner abutting the gasket 52 and screen 56, respectively. The liner 60 extends in a coaxial relationship with the openings in the plug members 42 and 44, and therefore with the pipes 46 and 22. The diameter of the liner 60 is less than that of the inner shell 48 to define an annular chamber 62.

A pair of end rings 64 and 66 extend between the respective end portions of the inner shell 48 and the liner 60, with the end ring 64 abutting the gasket 52 and the end ring 66 abutting the screen 56. A helical tube 70 is disposed in the chamber 62, with the upper end portion of the tube registering with an opening formed through the upper end ring 64, and with the lower end being sealed. The tube 70 has a plurality of small outlet holes 72 extending through its wall, spaced equally throughout its length and directed towards the liner 60. An inner copper packing, shown by the reference numeral 74, is spaced throughout the chamber 62, and an additional copper packing 76 is disposed within the liner 60 and extends through the entire length of the liner for permitting a uniform distribution of vapors throughout the shell. A plurality of vent openings are provided with each being disposed through the inner shell 48, the insulation 50, and the outer shell 40, with two of such openings being shown by the reference numeral 77.

The vortex tube 26 is supported on the condensing unit 24 by a coupling 78 which extends through corresponding openings formed in the plug member 42 and the gasket 52, and which registers with the opening in the end ring 64. The vortex tube 26 has an inlet 26a adapted for connection to the compressed air line 30, an upper outlet 26b which discharges to atmosphere, and a lower outlet 26c which registers with the helical tube 70 via the coupling 78 and the opening in the end ring 64. Since the vortex tube 26 is of a conventional design and per se does not form any part of the present invention, it will be described only generally as follows. The compressed air entering the inlet 26a from the line 30 passes through a plurality of nozzles formed in the tube which inject the air at sonic speeds circumferentially into a vortex generation chamber also formed within the tube. A vortex is formed which moves through the tube toward the hot outlet 26b and the spinning air near the surface of the tube becomes hot and discharges through a control valve at this outlet. The control valve imposes enough pressure on the vortex to force some of the air to the center and back through the tube where it discharges from the outlet 26c. As a result, the temperature of this latter air can be reduced as much as 100°F. before it discharges through the outlet 26c. This type of vortex tube is manufactured by the Vortec Corporation of Cincinnati, Ohio and is well described in their available literature.

Referring again to FIG. 2, a temperature probe 80 is disposed in the liner 60 and is connected, via a conductor 82, to a temperature valve 84 which is mounted in the air line 30. The valve 84 is adapted to operate in response to a signal received from the probe 80 to vary the amount of compressed air introduced into the inlet 26a of the vortex tube 26 and thus regulate the amount of cold air discharged from the outlet 26c of the vortex tube into the helical tube 70.

In operation, compressed air from the compressor 28 is passed through the line 30 and introduced into the inlet 26a of the vortex tube 26. The latter tube operates in the manner described above to produce a stream of cold air which is discharged from the outlet 26c and through the connection 78 and the opening in the end ring 64 to the helical tube 70. The packings 74 and 76 function to maximize the heat exchange between the cold air and the shells 40 and 48 and the liner 60 as the air discharges through the openings 72 as it passes through the tube 70 for the length of the chamber 62. As a result, the shells 40 and 48 and the liner 60 are maintained in a relatively cold state, usually below 15°F.

The gasoline vapors from the tanks 12 pass through the pipes 14, 16, and 18 and into the line 22 before entering the liner 60 and passing upwardly through the packing 76. The vapors thus pass in a heat exchange relation to the relatively cold air passing through the helical tube 70 which causes a substantial portion of the vapors to condense. The resulting condensate passes back down the liner 60 under the force of gravity and into and through the pipe 22 where it passes through the pipe 16 back to the center storage tank 12. During this downward movement of the condensate in the packing material 76, the condensate absorbs a portion of the vapors passing upwardly in the liner to increase efficiency of the system. The temperature probe 80 constantly monitors the temperature within the liner 60 and controls the flow of compressed air to the inlet 26a of the vortex tube 26 accordingly, to insure optimum performance of the system.

The small portion of the vapors not condensed in the above process will, along with excess air, pass outwardly through the central opening in the gasket 52 and through the vent pipe 46 to atmosphere.

It is thus seen that the system of the present invention provides a simple, efficient and economical means for recovering vapors from a storage tank, condensing the vapors, and returning the condensate to the tank.

It is emphasized that the system of the present invention is not limited to use in connection with a gasoline storage system but rather can be used in other environments. For example, the system of the present invention can be used in a similar manner in the bulk gasoline storage tanks discussed above, or in connection with solvent based cleaning processes, diesel fuel, or the like.

Of course, variations of the specific construction and arrangement of the assembly disclosed above can be made by those skilled in the art without departing from the invention as defined in the appended claims.

We claim:
1. A system for recovering and condensing vapors from a liquid storage tank, said system comprising a shell, means connecting the storage tank to said shell for permitting the vapors in said tank to pass into said shell, a liner disposed in said shell for receiving said vapors, a vortex tube adapted for connection to a source of compressed air and adapted to convert said air into a stream of cold air, a helical tube connected to said vortex tube and extending around said liner, said helical tube being perforated to permit said cold air to discharge therefrom and pass in a heat exchange relation to said vapors to condense said vapors, and means for passing said condensed vapors back to said storage tank.

2. The system of claim 1, further comprising a packing material disposed in said liner through which said vapors pass.

3. The system of claim 1, further comprising a packing material disposed in a space defined between said liner and said shell, said cold air passing through said packing material.

4. The system of claim 1, wherein said connecting means is connected to a lower portion of said liner to permit said vapors to pass in a generally upwardly direction through said liner, said vapors, after condensing, passing by gravity in a generally downwardly direction in said liner to absorb a portion of said upwardly passing vapors.

5. A system for recovering and condensing vapors from a liquid storage tank, said system comprising a shell, means connecting the storage tank to said shell for permitting the vapors in said tank to pass into said shell, an inner liner disposed in said shell for receiving said vapors, a packing material disposed in said liner through which said vapors pass, a vortex tube adapted for connection to a source of compressed air and adapted to convert said air into a stream of cold air, a helical tube connected to said vortex tube and extending around said liner so that cold air is passed through said tube in a heat exchange relation to said vapors to condense said vapors, and means for passing said condensed vapors back to said storage tank.

6. The system of claim 5, further comprising temperature responsive means responsive to the temperature in said shell for regulating the amount of cold air supplied to said shell by said vortex tube.

7. The system of claim 6, wherein said temperature responsive means includes means to regulate the amount of compressed air supplied to said vortex tube.

8. The system of claim 5, further comprising a packing material disposed in a space defined between said liner and shell, said cold air passing through said latter packing material.

9. The system of claim 5, wherein said connecting means is connected to a lower portion of said inner liner to permit said vapors to pass in a generally upwardly direction through said liner, said vapors, after condensing, passing by gravity in a generally downwardly direction in said liner to absorb a portion of said upwardly passing vapors.

10. A system for recovering and condensing vapors from a liquid storge tank, said system comprising a shell, means connecting the storage tank to said shell for permitting the vapors in said tank to pass into said shell, an inner liner disposed in said shell for receiving said vapors, a packing material disposed in a space defined between said inner liner and said shell, a vortex tube adapted for connection to a source of compressed air and adapted to convert said air into a stream of cold air, a helical tube connected to said vortex tube and extending in said space so that said cold air is passed through said tube in a heat exchange relation to said vapors to condense said vapors, and means for passing said condensed vapors back to said storage tank.

11. The system of claim 10, further comprising temperature responsive means responsive to the temperature in said shell for regulating the amount of cold air supplied to said shell by said vortex tube.

12. The system of claim 11, wherein said temperature responsive means includes means to regulate the amount of compressed air supplied to said vortex tube.

13. The system of claim 10, wherein said connecting means is connected to a lower portion of said inner portion to permit said vapors to pass in a generally upwardly direction through said liner, said vapors, after condensing, passing by gravity in a generally downwardly direction in said liner to absorb a portion of said upwardly passing vapors.

14. A system for recovering and condensing vapors from a liquid storage tank, said system comprising a shell, means connecting the storage tank relative to a lower portion of said shell for permitting the vapors in said tank to pass into said shell and through said shell in an upwardly direction, a vortex tube adapted for connection to a source of compressed air and adapted to convert said air into a stream of cold air, means connected to said vortex tube for passing said cold air through said shell in a heat exchange relation to said vapors to condense said vapors, and means for passing said condensed vapors in said shell back to said storage tank in a generally downwardly direction under the force of gravity to absorb a portion of the upwardly passing vapors.

15. The system of claim 14, further comprising temperature responsive means responsive to the temperature in said shell for regulating the amount of cold air supplied to said shell by said vortex tube.

16. The system of claim 13, wherein said temperature responsive means includes means to regulate the amount of compressed air supplied to said vortex tube.

17. The system of claim 14, wherein said vapor passing means comprises a liner disposed in said shell, said liner being connected to said connecting means for receiving said vapors.

18. The system of claim 17, wherein said shell and said liner extend in a substantially vertical direction, and wherein said cold air passing means is adapted to pass said cold air in a generally downwardly direction through said shell.

19. The system of claim 14 further comprising temperature responsive means responsive to the temperature in said shell for regulating the amount of cold air supplied to said shell by said vortex tube.

20. The system of claim 19 wherein said temperature responsive means includes means to regulate the amount of compressed air supplied to said vortex tube.

21. The system of claim 14 wherein said shell comprises an outer portion, an inner portion and insulation means extending between said portions.

* * * * *

UNITED STATES PATENT OFFICE
CERTIFICATE OF CORRECTION

Patent No. 3,956,903          Dated May 18, 1976

Inventor(s) TRUEMAN W. HILLER and KLAUS D. JARR

It is certified that error appears in the above-identified patent and that said Letters Patent are hereby corrected as shown below:

In the specification, column 3, line 60, change "/0" to -- 70 --

In the claims, claim 16, line 22, change "13" to -- 15 --

Signed and Sealed this

Twenty-seventh Day of July 1976

[SEAL]

Attest:

RUTH C. MASON
*Attesting Officer*

C. MARSHALL DANN
*Commissioner of Patents and Trademarks*